United States Patent [19]

Hillis

[11] 4,155,682
[45] May 22, 1979

[54] PROPULSIVE DEVICE

[76] Inventor: Franklin R. Hillis, 4467 Vieux Carre Cir., Lutz, Fla. 33549

[21] Appl. No.: 877,960

[22] Filed: Feb. 15, 1978

Related U.S. Application Data

[63] Continuation-in-part of Ser. No. 621,465, Oct. 10, 1975, abandoned.

[51] Int. Cl.² .................... F04F 5/24; F04F 5/02
[52] U.S. Cl. ................................ 417/169; 417/196
[58] Field of Search ................... 417/167–169, 417/163, 174, 196

[56] References Cited

U.S. PATENT DOCUMENTS

| | | | |
|---|---|---|---|
| 673,984 | 5/1901 | Hoberecht | 417/174 |
| 801,641 | 10/1905 | Boetcher | 417/174 |
| 1,423,198 | 7/1922 | Davenport | 417/174 |
| 1,498,663 | 6/1924 | Losel | 417/167 |
| 1,583,363 | 5/1926 | Ostermann | 417/167 |
| 2,100,185 | 11/1937 | Engstrand | 417/170 |
| 2,444,615 | 7/1948 | Reinhardt | 417/170 |
| 3,213,807 | 10/1965 | Ramsden | 417/196 |
| 3,525,474 | 8/1970 | Von Ohain et al. | 417/169 |
| 3,808,779 | 5/1974 | Randall | 417/169 |
| 3,857,651 | 12/1974 | Bruno | 417/163 |

FOREIGN PATENT DOCUMENTS

| | | | |
|---|---|---|---|
| 308328 | 5/1919 | Fed. Rep. of Germany | 417/169 |
| 217585 | 8/1968 | U.S.S.R. | 417/170 |

*Primary Examiner*—William L. Freeh
*Attorney, Agent, or Firm*—Carver and Company

[57] ABSTRACT

Fluid propulsive device for accelerating flow of fluid passing through the device, for pumping fluid, or solids carried in fluid, or for propelling the device through fluid. The device has a main body having a duct provided with primary and secondary jet means adapted to receive working fluid under pressure. The jet means extend peripherally around the duct generally within planes normal to duct central axis and direct conical sprays of working fluid downstream into the duct. Primary jet means sprays working fluid initially at a conical semi-angle of between 18° and 30° so as to converge inwards initially towards a theoretical apex of the cone of the spray adjacent the duct central axis. Secondary jet means disposed downstream of the primary jet means within plane containing theoretical apex sprays fluid initially at angle of between 6° and 10° to duct side wall. Improved efficiency of pump attributed to reduction in undesirable effects of turbulence and boundary layer adjacent duct side wall.

11 Claims, 9 Drawing Figures

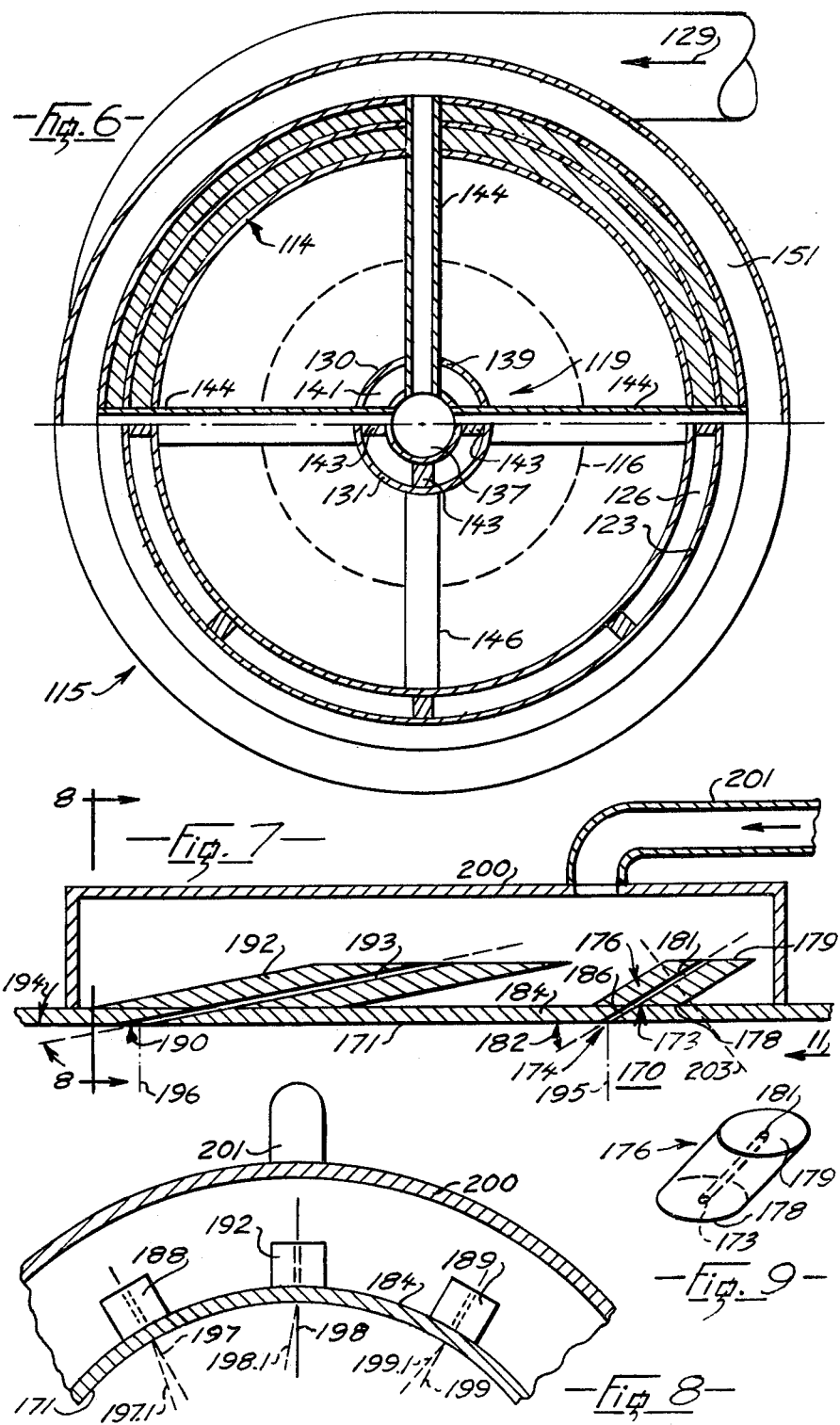

PROPULSIVE DEVICE

CROSS REFERENCES TO OTHER APPLICATIONS

This is a continuation-in-part of my application Ser. No. 621,465 filed Oct. 10, 1975 entitled PROPULSIVE DEVICE now abandoned.

BACKGROUND OF THE INVENTION

1. Field of the Invention

The invention relates to a propulsive device for accelerating flow of a fluid passing through the device, particularly for use as a fluid pump for pumping fluids, for propelling or separating solids carried in fluids, or for propelling the device through a fluid.

2. Prior Art

The term "fluid" herein refers to liquids, gases or a mixture of both. Many types of fluid propulsive devices are known, some of which use a powered rotating member which rotates within the fluid, such as a common propeller as used in marine vessels or aircraft, or an impeller as used in centrifugal or vane pumps. Some of these common pumps are relatively inefficient and when used to pump a fluid carrying relatively fragile solids, the rotating member can damage the solids. Many of such pumps could not be used for separating fine solids carried in fluids.

Some of the limitations above are overcome by using jet pumps, such as injectors, ejectors, eductors, etc. Such pumps use a common fluid pump as a primary pump to produce a central jet of working fluid within a duct carrying a main fluid, which jet accelerates flow of the main fluid through the duct. In many jet pumps, power consumed by the primary pump in pumping the working fluid far exceeds the power than would have been required for pumping the main fluid using only a common rotary fluid pump. Such jet pumps are thus generally relatively inefficient and consequently are usually used only in applications where the normal rotary pump is not practical, for instance when transporting fragile solids carried in the main fluid.

Some authorities feel that the relative inefficiency of the common jet pump results from two major factors. Firstly, there is a relatively large velocity difference between the working and main fluids during mixing, which produces turbulence resulting in excessive energy losses. Secondly, a viscous boundary layer formed adjacent the duct side wall reduces efficiency of the device by reducing flow rate.

SUMMARY OF THE INVENTION

The present invention reduces difficulties of the prior art devices by providing an improved propulsive device which can be used as a jet pump for propelling fluids, for propelling or separating solids carried in fluids, or as a device to propel vessels through fluids. Improvements of efficiency of the device for pumping fluids when compared to prior art devices is attributed to reduction of undesirable effects of the boundary layer and turbulence.

A propulsive device according to the invention has a main body characterized by a main duct and primary and secondary jet means. The main duct is defined by a duct side wall and has an essentially constant cross sectional area and a duct central portion. The primary jet means is adapted to receive working fluid under pressure and extends peripherally around a portion of the main duct generally within a primary diametrical plane. The primary jet means is adapted to project downstream into the main duct a primary generally conical spray of working fluid and has an axis inclined initially to the duct side wall at an angle of inclination of between approximately 18 degrees and 30 degrees so that the spray tends to converge inwardly intially generally towards the central portion of the duct. The secondary jet means is adapted to receive working fluid under pressure and extends peripherally around a portion of the main duct generally within a secondary diametrical plane and is adapted to project downstream into the main duct a secondary partially conical spray of working fluid. The secondary diametrical plane is disposed downstream of the primary diametrical plane so as to be generally adjacent an intersection of the axis of the primary jet means with the duct central portion. The secondary jet means has an axis inclined to the duct side wall at an angle of between approximately 6 degrees and 10 degrees.

A second embodiment of the device further includes an inner body disposed within the main duct to form an annular duct of essentially constant cross sectional area so that the duct central portion is annular and is spaced midway between the inner body and the main body and surrounds the inner body. The inner body receives working fluid under pressure and is characterized by inner primary and secondary jet means extending peripherally around a portion of the inner body and receiving working fluid under pressure. The inner primary jet means is disposed generally within the primary diametrical plane and is adapted to project downstream into the annular duct an inner primary partially conical spray of working fluid. The inner primary jet means has an axis inclined initially to the inner body side wall at an angle generally equal to the angle of inclination of the primary jet means of the main duct so that the axis of the inner primary jet means intersects the axis of the primary jet means of the main duct approximately at the duct central portion. The inner secondary jet means is disposed generally within the secondary diametrical plane and is adapted to project downstream into the annular duct an inner secondary partially conical spray of working fluid, the inner secondary jet means having an axis inclined to the side wall of the inner body at an angle which is generally equal to the angle of inclination of the secondary jet means of the main duct.

A detailed disclosure following, related to drawings, described preferred embodiments of the invention which however, is capable of expression in structure other than that particularly described and illustrated.

DESCRIPTION OF THE DRAWINGS

FIG. 6 is a simplified section on Line 6—6 of FIG. 5, some portions being omitted, FIG. 7 is a simplified fragmented section through a portion of an alternative device, showing alternative jet means, FIG. 8 is a simplified fragmented section on Line 8—8 of FIG. 7, FIG. 9 is a perspective of one alternative nozzle element.

DETAILED DISCLOSURE

Figure 1:
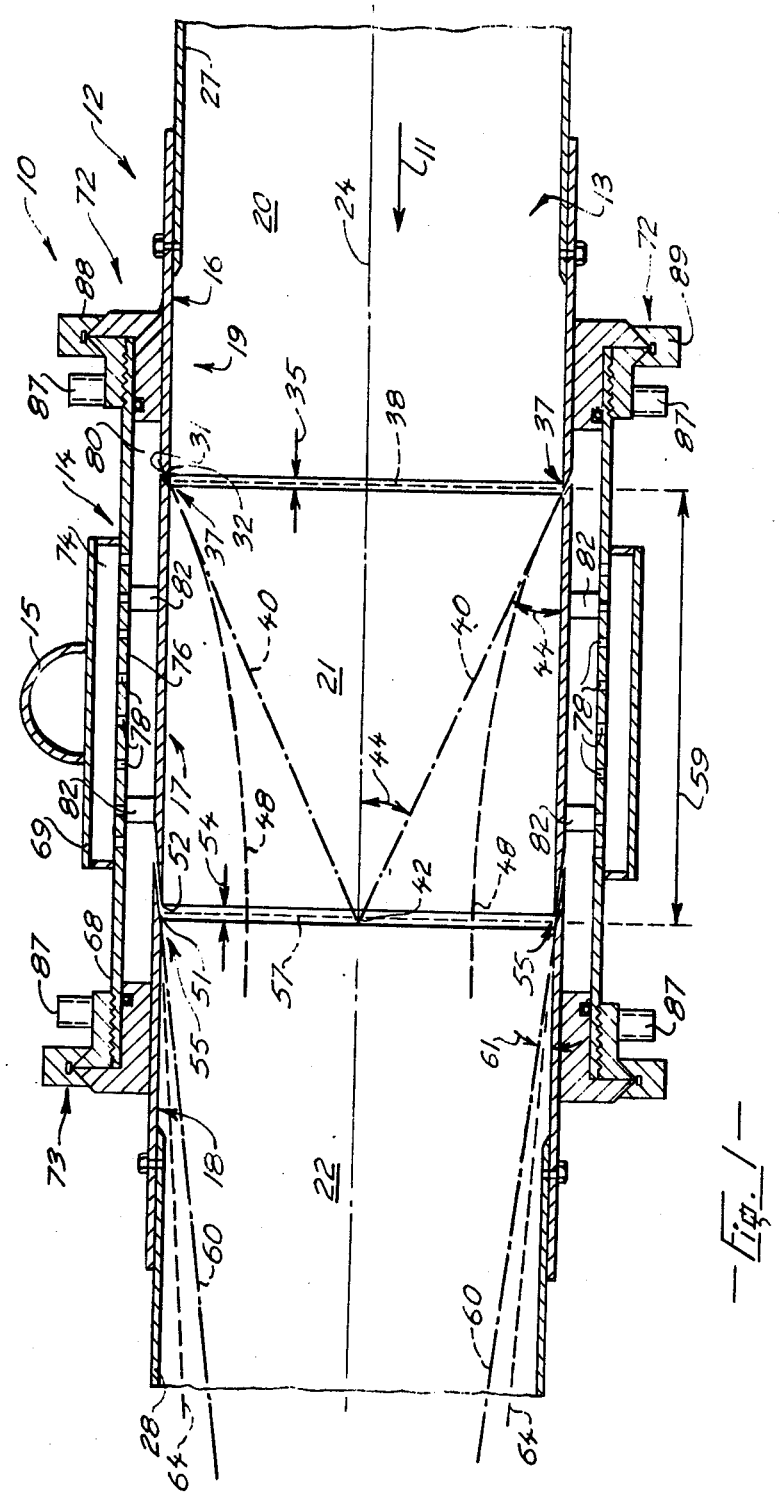
FIG. 1 is a simplified longitudinal section on a central axis of a propulsive device according to the invention.
Figure 2:
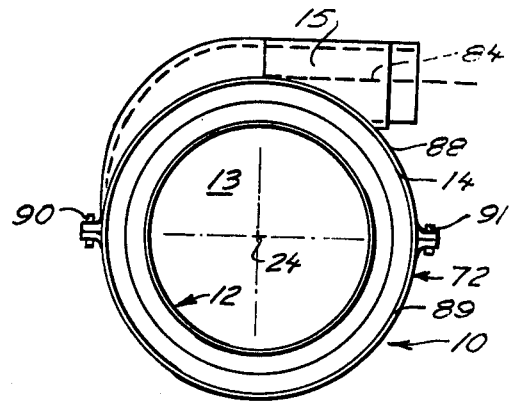
FIG. 2 is a simplified end elevation of the device of FIG. 1.
Figure 3:
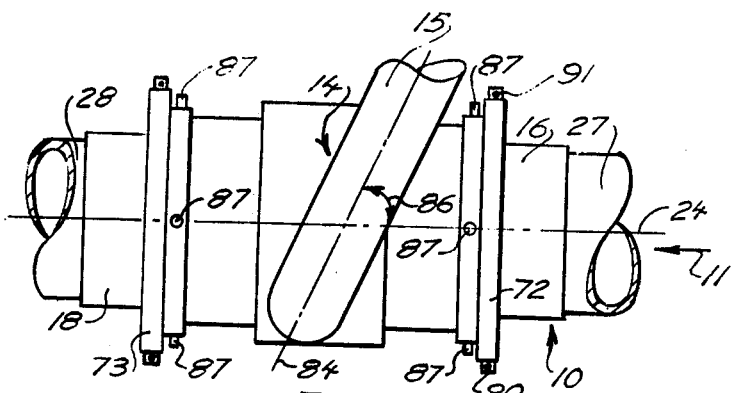
FIG. 3 is a simplified fragmented top plan of the device of FIG. 1.

FIGS. 1 through 3

With reference particularly to FIG. 1, a propulsive device 10 according to the invention has a main body 12 having a main duct 13 defined by a duct side wall 19. The device serves as a pump for accelerating flow of a main fluid, such as air or water, passing therethrough in direction of an arrow 11, and has a manifold 14 extending around the duct and supplied with a pressurized working fluid from an input pipe 15. The working fluid can be air or water pressurized by a common primary pump, not shown. The duct is formed by closely spaced hollow upstream, central and downstream duct portions 16, 17 and 18 respectively having corresponding upstream, central and downstream passages 20, 21 and 22 respectively. The passages are aligned, disposed symmetrically about a duct central longitudinal axis 24 and have approximately equal cross-sections so that the duct has an essentially constant cross-sectional area along the length thereof. An upstream pipe portion 27 and a downstream pipe portion 28 are secured adjacent respective upstream and downstream duct portions to communicate therewith. The upstream pipe portion is immersed in or fed with the main fluid to be accelerated by the device 10, and thus serves as an intake portion.

A downstream edge 31 of the upstream portion 16 is spaced from an adjacent opposed upstream edge 32 of the central portion 17 by a first axial spacing 35 measured parallel to the axis 24 to define a primary jet means 37. The means 37 extends peripherally around a portion of the main duct generally within a primary diametrical plane 38 (broken outline) disposed normally to the axis 24, thus forming an essentially continuous jet means or peripheral nozzle. The jet means 37 communicates with the manifold 14 to receive the working fluid under pressure and the opposed edges 31 and 32 defining the jet means are chamfered and thus are adapted to project downsteam into the main duct a primary generally conical spray 40 of working fluid. The edges 31 and 32 are shaped so that the spray is initially directed to converge on the longitudinal axis 24 at a theoretical apex 42 of the cone. The cone has a conical semi-angle 44 which, in this instance, is about 26 degrees and should be preferably between 18 and 30 degrees. Note that the spray 40, shown by centerlines thereof which represent an axis of the jet means, is thus inclined initially to the side wall 19 and the axis 24 at the angle 44, but this shows a theoretical condition only which occurs with no main fluid within the duct 13. The position of the apex 42 is determined theoretically by extending centerlines of diametrically opposed portions of the first jet means 37 to intersect mutually on the axis 24. Note that the theoretical intersection of the jets is not attained in normal operating conditions, because when a jet pump operates the working fluid projected through the jet means 37 induces the flow of the main fluid through the duct 13 in the direction of the arrow 11, which flow modifies the spray pattern so that it approaches a general shape somewhat as shown by broken lines 48. The theoretical intersection of water used as a working fluid is likely attained approximately with relatively still air in the duct. The jet means 37 is further described with reference to FIG. 4.

An upstream edge 51 of the downstream portion 18 and an adjacent opposed downstream edge 52 of the central portion 17 are separated by a second axial spacing 54 to define a secondary jet means 55. The secondary jet means extends peripherally around a portion of the main duct generally within a secondary diametrical plane 57 (broken line), the plane 57 being disposed normally to the axis 24 and spaced downstream from the plane 38 by a longitudinal jet separation 59. The angle 44 and the jet separation 59 are selected so that, with no flow of main fluid within the duct 13, the theoretical apex 42 of the conical spray 40 is disposed generally adjacent a center of the secondary plane 57. Thus it can be seen that the secondary diametrical plane is disposed downstream of the primary diametrical plane so as to be generally adjacent an intersection of the axis of the primary jet means with a duct central portion adjacent and enclosing the duct axis 24. For the device 10, the duct central portion is a theoretical generally cylindrical volume concentric with the axis 24 extending down the center of the duct. The secondary jet means also communicates with the manifold 14 to receive the working fluid under pressure and the opposed edges 51 and 52 defining the jet means 55 are chamfered and thus are adapted to project downstream into the main duct a secondary partially conical spray of working fluid 60. The edges 51 and 52 are shaped so that, with no main fluid flow in the main duct, the conical spray 60 has a conical semi-angle of about 7 degrees. Centerlines of the spray are shown and these represent an axis of the jet means, the actual intersection of spray at the theoretical apex of the cone not being shown. By geometry, angle 61 of the spray jet inclined to the duct side wall equals the conical semi-angle and in operation of the device, flow of main fluid passing through the duct 13 modifies the secondary spray 60 to follow a modified spray shape shown generally as broken outline 64. The angle 61 is selected so that the secondary conical spray tends to reduce undesirable boundary layer effects occurring downstream of the primary jet means and can almost approach being parallel with the duct side wall. A practical range of the angle 61 is between 3 degrees and 10 degrees, and should be between 6 degrees and 10 degrees, but in some applications this range can be extended. It can be seen that portions of the duct side wall immediately adjacent the primary and secondary jet means are of constant cross section so as to reduce turbulence of fluid approaching the jet means, which contrasts with some prior art devices.

The manifold 14 has inner and outer casing 68 and 69 respectively, the inner casing 68 enclosing the main body 12 and being secured thereto by spaced annular connectors 72 and 73 respectively. The outer casing 69 encloses a central portion of the inner casing 68 to define a first annular manifold 74. The manifold 74 has an inner wall 76 having a plurality of perforations, several being designated 78. A second manifold 80 is defined by the inner casing 68, a portion of the hollow body 12 and portions of the connectors 72 and 73. The second manifold communicates directly with the primary and secondary jet means 37 and 55 and, through the perforations 78 in the wall 76, also communicates with the first manifold 74. Radial support members, severally 82, extend between the inner casing 68 and the central portion 17 to support the portion 17 in a position concentric and aligned with the upstream and downstream portions 16 and 18 respectively.

As seen best in FIGS. 2 and 3 the input pipe 15 is connected generally tangentially to the manifold 14 and has a central axis 84 inclined at an angle 86 to the duct central axis 24. Thus working fluid flowing into the manifold 14 enters essentially tangentially, and also inclined to the axis 24 at a helix angle approximately equal to the angle 86. Thus a partially helical flow is produced within the first manifold 74, which flow is believed to reduce initial turbulence and thus increase efficiency. The perforations 78 in the inner casing 68 change flow direction of the working fluid to essentially radial flow so that working fluid entering the second manifold 80 is essentially non-helical flow, resulting in essentially longitudinal flow of working fluid through the first and second jets. However, a shallow helical flow through the jet means can be attained and this is desirable in some instances.

Figure 4:
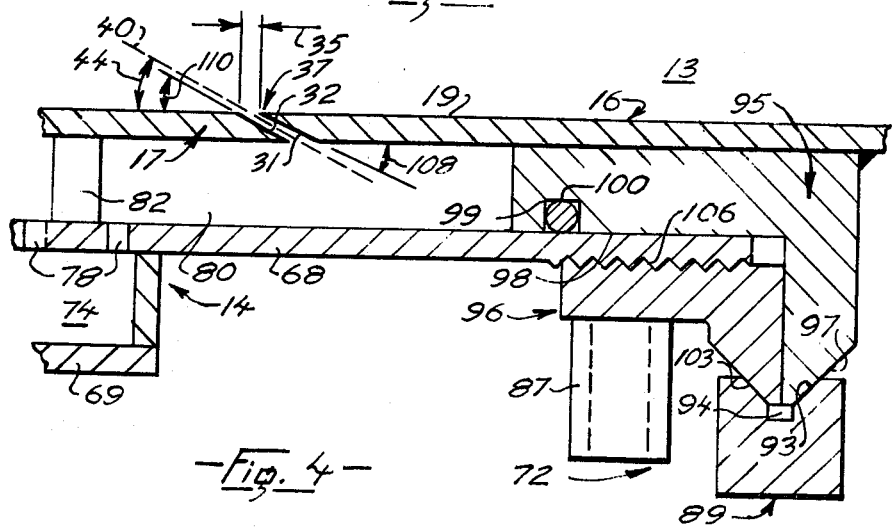
FIG. 4 is a fragmented detail section at enlarged scale showing portions of components adjacent one jet means of the device of FIG. 1.

A plurality of short radial pipes 87 extend from portions of the annular connectors 72 and 73, the pipes accepting a tommy bar (not shown) to facilitate rotation of the connectors relative to the manifold 14 to vary size of the jet means, as will be described with reference to FIG. 4. As best seen in FIG. 2, the annular connector 72 includes a pair of similar semi-circular clamps 88 and 89, each clamp extending over approximately 180 degrees around the main body. Adjacent ends of the clamps are secured together by nut and bolt means 90 and 91 to permit adjustment of the connector as required. Sizes of the jet means, i.e., the spacing 35 and 54, determines in part flow of working fluid through the jet means, which flow is adjusted to attain a desired flow of main fluid through the duct 13. Note that adjustment of the connector 72 adjusts the spacing 35 and independent adjustment of the connector 73 adjusts the spacing 54. Maximum cross-sectional area of the jet means together is less than the cross-sectional area of the input pipe 15 to ensure that adequate flow of working fluid reaches the jet means.

FIG. 4

The semi-circular clamp 89 has an inwardly inclined "V" sectioned inner face 93 with a clearance groove 94. The annular connector 72 also includes inner and outer "L" sectioned rings 95 and 96 which cooperate with the semi-circular clamps 88 and 89. The ring 95 is secured to the upstream portion 16, and has a partially conical face 97 generally complementary to one-half of the inner face 93 of the clamp 89. The ring 95 also includes a circumferential bearing surface 98 having an annular groove 99 therein to accept an "O" ring seal 100 which engages an inner surface of the casing 68 to prevent leakage of fluid between the casing and the ring. The outer "L" sectioned ring 96 has a partially conical face 103, which is complementary to an opposite half of the inner face 93 of the clamp 89, and a female thread 106 on an inner annular face thereof, which thread engages a male thread on an upstream end of the inner casing 68. Thus the inner face 93 of the clamp 89 and a similar face on the clamp 88 engage the partially conical faces of the inner and outer "L" sectioned rings and forces the rings together to produce a rigid connection therebetween.

For adjustment of the spacing 35 of the first jet means, the clamps 88 and 89 are partially released by loosening the nut and bolt means 90 and 91 (FIGS. 2 and 3 only). The tommy bar (not shown) is then inserted in one of the pipes 87 so that the outer ring 96 can be rotated relative to the inner casing 68. Such rotation results in a relative longitudinal movement between the casing 68 and the inner ring 95, which ring is connected directly to the upstream portion 16. The radial supports 82 connect the casing 68 to the central portion 17, and thus the rotation varies the spacing 35 between the central portion 17 and the upstream portion 16, thus changing the jet means width. The means 90 and 91 are then re-tightened to lock the connector 72, and a similar procedure can be followed to adjust size of the secondary jet means. Thus the duct portions are connected together to permit relative axial movement between the duct portions to vary jet size.

The downstream edge 31 of the duct portion 16 is chamfered so as to be disposed obliquely to the duct axis 24 at an angle 108, about 24 degrees. The upstream edge 32 of the portion 17 is similarly chamfered and disposed to the axis 24 at an angle 110, about 28 degrees. Thus the chamfered edges of the duct portions form portions of cones in which the angles 108 and 110 define semi-angles of the cones defining the chamfered edges. The angle of the cone is selected so that the downstream edge is inclined to the axis 24 at a steeper angle than the upstream edge, so that spacing between the adjacent edges decreases towards the duct, thus producing a convergent jet having an angle of convergence of about 4 degrees. The spray is shown to have the theoretical center line 40 inclined at the angle 44, which as aforesaid is nominally 26 degrees. Thus the jet means has a minimum spacing at the outlet thereof ajdacent the duct side wall 19. The minimum jet spacing at the outlet can be between approximately 0.010 inches and 0.1 inches, depending on the flow requirements. For a given manifold pressure, which can be between 50 p.s.i. and 150 p.s.i., increasing jet means spacing increases flow through the jets, and decreases pressure in the manifold. The manifold pressure is adjusted to obtain a desired main fluid flow through the duct.

One example of the invention has a main duct diameter of 10 inches with angles specified as above, and with jet means gaps of 0.05 inches for both the primary and secondary jet means and a manifold pressure of 90 pounds per square inch, a column of water 12 feet high was maintained above a surface of water. The working fluid was water fed from a common centrifugal primary pump powered by a 30 horsepower motor.

For normal manifold pressures of up to 150 pounds per square inch, about 12 inches is considered the maximum duct diameter. If the duct diameter is increased much above 12 inches, penetration of the primary spray into the main fluid flow is likely to be insufficient for efficient transfer of energy between the fluids. Thus when a greater mass flow through the main duct is required, an alternative device, shown in FIGS. 5 and 6, may be preferable.

The longitudinal jet separation 59 is fairly critical and should be such that the secondary plane 57 is approximately adjacent the theoretical apex 42 of the primary conical spray. It is noted that when the angle 44 is approximately 26 degrees, as shown, the jet separation 59 is approximately equal to the duct diameter. This is an approximation and an optimum location can be found by experiment. Efficiency of the device is attributed to reduction by the secondary jet means of undesirable boundary layer effects resulting from a boundary layer formed downstream of the primary jet means. The secondary jet means is inclined at the shallow angle 61 to accelerate the main fluid flow adjacent the side wall 19 downstream from the secondary jet means, which flow is normally considerably slower than the mainstream flow due to boundary layer effects. The secondary jet means thus apparently reduces the undesirable boundary layer effects and may reduce turbulence to increase flow through the duct. It is essential that the secondary jet is inclined to be almost parallel, i.e., essentially parallel, with the duct side wall so as not to project far into the main flow, otherwise the effectiveness of the secondary jet means is considerably reduced.

The above pressure and dimensions relate to use of the device with water as the working fluid and the main fluid. This has applications in pumping water with water, as in transporting solids such as fish suspended in water, and is applicable where liquid pumps for pressurizing the working fluid are available. Alternatively, a gas, such as air, can be used as the working fluid, but when a gas is used to pump a liquid as the main fluid, higher manifold pressures for the gas are usually required. Alternatively both the main fluid and the working fluid can be gases and the device could then be used as a fan for drawing air or air containing suspended solids, such as in dust extraction. If a liquid is used as a working fluid to pump air, for example using water to induce a flow in an exhaust flue, particles in the exhaust gas can be separated with the liquid. Thus the device can be used as a gas scrubber. Other combinations of working and main fluids can be devised for other applications.

ALTERNATIVES AND EQUIVALENTS

Figure 5:
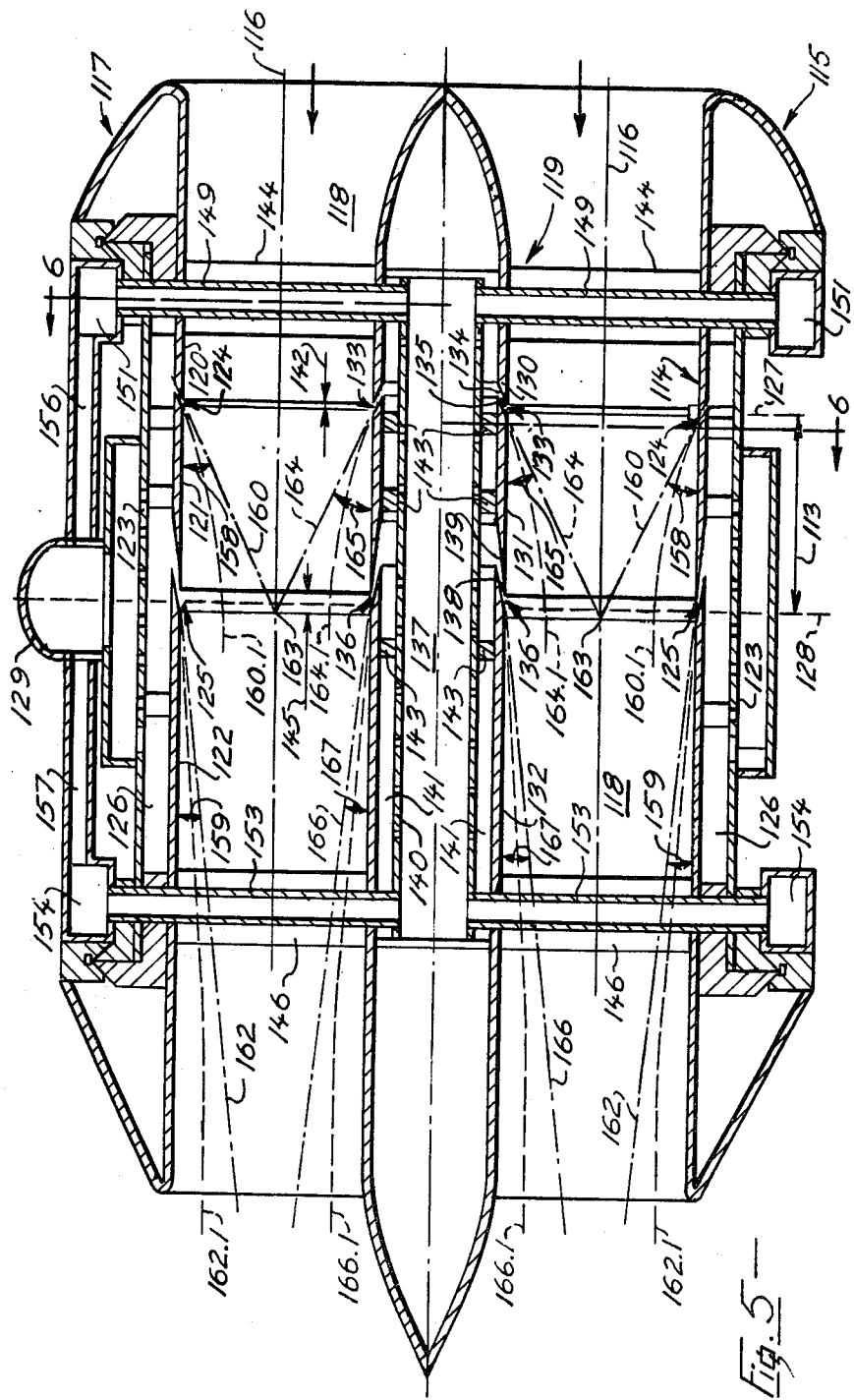
FIG. 5 is a simplified longitudinal section on a central axis of an alternative propulsive device, particularly adapted for propelling vessels through fluids.

FIGS. 5 and 6

Reference mainly to FIG. 5, a second embodiment 115 of the invention is particularly for use in propelling vessels through water, or for applications requiring flow rates higher than that attainable solely with a main duct. The embodiment 115 has a main body 117 having a main duct defined by a dust side wall 114 and an inner body 119 disposed within the main duct to form an annular duct 118 surrounding the inner body. The annular duct 118 has an annular axis 116 spaced equally between the inner and main bodies, the main body 117 being formed similar to the body 12 of FIG. 1 of closely spaced hollow upstream, central and downstream duct portions 120, 121 and 122. The portion 120 defines an intake and the portion 122 defines an exhaust, the three duct portions being aligned and having approximately equal cross-sections. The main body has primary and secondary jet means 124 and 125 disposed within primary and secondary diametrical planes 127 and 128 respectively spaced by a longitudinal jet separation 113 and receiving a working fluid under pressure supplied by a manifold 126. The working fluid is fed to the manifold by an input pipe 129 and passes to the jet means through a perforated baffle 123. Structure relating to the jet means of the main body is generally similar to that for the device 10 of FIG. 1.

The inner body 119 has similar closely spaced upstream, central and downstream inner body portions 130, 131 and 132, the inner body portions being aligned and having approximately equal cross-sections so that the annular duct has essentially constant cross-sectional area throughout its length. Thus the annular duct 118 has a duct central portion which is similarly annular and is spaced midway between the inner body and the main body so as to be adjacent and enclose the annular axis 116. Ends of the inner body are faired to reduce turbulence and drag. The inner body has an inner primary jet means 133 extending peripherally around a portion of the inner body and being defined by an axial spacing 142 between a downstream edge 134 of the adjacent upstream portion 130 and adjacent opposed upstream edge 135 of the central inner portion 131. The inner body also has an inner secondary jet means 136 extending peripherally around a portion of the inner body and being disposed downstream from the jet means 133. The means 136 is defined by an axial spacing 145 between an upstream edge 138 of the downstream inner portion 132 and an adjacent opposed downstream edge 139 of the central inner portion 131. The inner primary and secondary jet means 133 and 136 are spaced radially inwards from the jet means 134 and 125 of the main body 117 and are disposed generally within the primary and secondary planes 127 and 128 respectively. The opposed edges of the inner body portions are chamfered to form convergent and downstream inclined jet means similar to the jet means of the main duct. Means, not shown, can similarly be provided to vary size of the inner jet means.

The inner body has an inner manifold 137 defined by a cylindrical perforated baffle 140, and an outer manifold 141 defined by an annular space between the perforated baffle 140 and the appropriate adjacent inner body portions of the inner body. Radial supports 143 extend between the baffle 140 and adjacent inner body portions to support the inner body portions relative to each other. The inner body 119 is supported at a forward end by a plurality of forward radial struts 144, and at the aft end by a plurality of similar aft radial struts 146. The struts 144 contain conduits 149 communicating the inner manifold 137 with an outer forward manifold 151. Similar conduits 153 in the aft struts 146 communicate with an aft manifold 154. Longitudinal pipes 156 and 157 extend from the input pipe 129 to feed the outer manifolds 151 and 154, which in turn feed working fluid to the inner manifold 137 of the body 119. The outer manifold communicates with the inner jet means and thus the inner jet means receive working fluid under pressure similarly to the jet means 124 and 125 of the main body.

The primary and secondary jet means 124 and 125 of the main body are adapted so as to project downstream into the annular duct 118 primary and secondary partially conical sprays 160 and 162 of working fluid, the sprays of working fluid from the jet means being inclined initially at angles 158 and 159 respectively to converge inwards as shown by broken lines representing cones of spray. The inner primary and secondary jet means 133 and 136 of the inner body 119 are similarly adapted to project downstream and outwards into the annular duct inner primary and secondary conical sprays 164 and 166, shown as broken lines. The inner primary conical spray is inclined essentially to the duct axis 116 at an angle 165 generally equal to the angle 158 of the primary jet means 124 of the main duct so as to converge initially towards a theoretical intersection 163 with the conical spray 160 of the jet means 124. The theoretical intersection 163 is closely adjacent the axis 116 that is approximately at a mid-position of the annular duct. Thus the inner primary jet means has an axis inclined initially to the inner body side wall at an angle generally equal to the angle of inclination of the primary jet means of the main duct, so that the axis of the inner primary jet means intersects the axis of the primary jet means of the main duct approximately at the duct central portion. Similarly the inner secondary conical spray 166 is inclined initially to the side wall of the inner body at a relatively shallow angle 167 which is generally equal to the angle 159 of the secondary jet means 125 of the main duct. Thus respective primary and secondary jet means of radially opposed portions of the main duct and inner body provide generally complementary conical sprays of working fluid which are inclined to each other with no main fluid flow, so that the complementary sprays converge and intersect on the annular axis 116, actual theoretical intersection being shown only for the sprays 160 and 164. It is noted that the longitudinal jet separation 113 between the primary and secondary jet means, and the angles 158 and 165 of the primary jet means are such that the theoretical conical sprays 160 and 164 converge at the theoretical intersection 163 which is disposed essentially within the diametrical secondary plane 128 containing both the secondary jet means 125 and 136. Similarly to the device 10 of FIG. 1, the theoretical intersection is not attained when a main fluid flows through the duct 118, because the theoretical conical sprays 160, 162, 164 and 166 are deflected to approximate curved paths shown as broken lines 160.1, 162.1, 164.1, and 166.1 respectively.

Thus, in the FIG. 5 embodiment, the jet means 124 and 133 of the bodies 117 and 119 are analogous to diametrically opposed portions of the jet means 37 of the embodiment of FIG. 1, and similarly the secondary jet means 125 and 136 are analogous to diametrically opposed portions of the jet means 55 of the embodiment of FIG. 1. In both embodiments the secondary jet means are directed to reduce undesirable boundary layer effects adjacent the downstream portions of the inner and outer bodies respectively. The device 115 can be fitted to a marine vessel in an unobstructed position below the waterline thereof so that there is relatively unrestricted flow into the intake and from the exhaust.

FIGS. 7 through 9

An alternative structure for the primary and secondary jet means is to provide a plurality of nozzles spaced peripherally around the duct side wall generally within the plane of the respective jet. This alternative structure provides a discontinuous jet means, in contrast with and as a substitute for, the continuous jet means of the structures of FIGS. 1 and 5.

Referring to FIG. 7, an alternative duct 170 has a side wall 171 which can be a continuous tube of constant cross-section. One nozzle 173 of an alternative primary jet means 174 is provided in a primary nozzle element 176. The nozzle element 176 has spaced inner and outer parallel end walls 178 and 179, and a passage 181 extending obliquely between the end walls. The passage is inclined to the end walls at an angle 182, which is equal to the conical semi-angle of the primary jet means (not shown) that is the passage 181 is inclined downstream to the side wall 171 at an angle of between 15 degrees and 45 degrees. The nozzle element is secured to an outer surface 184 of the duct, and the duct side wall has an obliquely disposed opening 186 aligned with the passage 181 in the nozzle element and within a plane containing the duct central axis (not shown). The element has sufficient depth to provide, with the opening 186, a nozzle of sufficient length to direct the primary conical spray of working fluid into the main duct, similarly to the sprays of the previous jet means, to converge inwards initially towards the theoretical apex of the cone of the primary spray.

An alternative secondary jet means 190 has a similar secondary nozzle element 192 similarly having a passage 193 inclined at a shallow angle 194 to the duct side wall, i.e., 3 through 10 degrees, and is thus generally equivalent to the secondary jet means of FIG. 1. As seen in FIG. 8, a plurality of similar nozzle elements extend peripherally around the main duct, two further elements 188 and 189 being shown. Peripheral spacing between the adjacent nozzle elements and bore of the nozzles is sufficient to provide a flow of working fluid of similar magnitude to the flow obtained with the continuous jet means of FIG. 1. Axes 197, 198 and 199 of the nozzle elements 188, 192 and 189 are shown disposed radially to the duct side wall 171. A plurality of such nozzle elements are thus provided in respective primary and secondary planes 195 and 196 containing the primary and secondary jet means which function similarly to the jet means previously described. It can be seen that, similarly to the devices of FIGS. 1 through 6, portions of the duct side wall immediately adjacent the primary and secondary jet means are of constant cross section so as to reduce turbulence of fluid approaching the jet means, which contrasts with some prior art devices.

A working fluid manifold 200 extends circumferentially around the main duct side wall and encloses both the primary and secondary nozzle elements and receives working fluid under pressure through an axially disposed input pipe 201. Thus working fluid is supplied simultaneously to the primary and secondary jet means passing therethrough in an amount proportional to the nozzle size which can be adjusted to suit requirements. The passages are preferably tapered inwards similarly to the tapering of the primary and secondary jet means of FIG. 1.

Refer to FIG. 9, the nozzle element 176 is seen to be a portion of a cylinder with obliquely cut end walls. A simple way of forming the nozzle element is to cut obliquely a thick walled tube into many tube sections having parallel ends to form nozzle elements, which are then individually welded to the duct side wall at the correct position and inclination. The bore of the tube then acts as a pilot hole for drilling the nozzle bore through the element and simultaneously through the duct side wall. It is noted that each section of tube can be inclined at any desired angle to the side wall 171, and thus when the nozzle is drilled the axis of the nozzle can be at a shallow helix angle, shown in FIG. 8 for the secondary jet axes at 197.1, 198.1 and 199.1. This would produce a slight helical flow through the duct, which is advantageous when transporting solids along shallow ducts reduce a tendency of the solids to settle out. To reduce the number of oblique cuts required to produce the nozzle elements, the thick walled tube can be cut obliquely into larger sections which are then bisected with a perpendicular cut, shown in broken line 203 in FIG. 7. This produces two nozzle elements from one oblique cut and one perpendicular cut, which simplifies manufacturing and results in the passage in the element being inclined obliquely to the inner end wall only.

Structure of FIGS. 7 through 9 can be more economical to produce, more versatile and may require less maintenance than that of FIG. 1, but, due to discontinuity of the jet means, may exhibit less efficient performance.

I claim:

1. A fluid propulsive device for accelerating flow of a main fluid passing through the device, the device having a main body characterized by:

(a) a main duct defined by a duct side wall and having an essentially constant cross-sectional area and a duct central portion, (b) a primary jet means adapted to receive working fluid under pressure, the jet means extending peripherally around a portion of the main duct generally within a primary diametrical plane and being adapted to project downstream into the main duct a primary generally conical spray of working fluid, the primary jet means having an axis inclined initially to the duct side wall at an angle of inclination of between approximately 18 degrees and 30 degrees so that the spray tends to converge inwards initially generally towards the duct central portion, (c) a secondary jet means adapted to receive working fluid under pressure, the secondary jet means extending peripherally around a portion of the main duct generally within a secondary diametrical plane and being adapted to project downstream into the main duct a secondary partially conical spray of working fluid, the secondary diametrical plane being disposed downstream of the primary diametrical plane so as to be generally adjacent an intersection of the axis of the primary jet means with the duct central portion, the secondary jet means having an axis inclined to the duct side wall at an angle of between approximately 6 degrees and 10 degrees.

2. A fluid propulsive device as claimed in claim 1 in which:
(a) the angle of inclination of the primary jet means is between 25 and 30 degrees and the angle of inclination of the secondary jet means is between 6 and 8 degrees.

3. A fluid propulsive device as claimed in claim 1 further including:
(a) a working fluid manifold extending around the duct, the manifold communicating with the primary and secondary jet means to supply working fluid under pressure to the primary and secondary jet means.

4. A fluid propulsive device as claimed in claim 1 in which:
(a) the side wall of the main duct of the hollow body is formed by closely spaced hollow upstream, central and downstream duct portions, the duct portions being of equal cross-sectional area and disposed concentrically relative to each other,
(b) the primary jet means is defined by an axial spacing between a downstream edge of the upstream duct portion and an opposed adjacent upstream edge of the central duct portion, thus forming an essentially continuous primary jet means,
(c) the secondary jet means is defined by an axial spacing between an upstream edge of the downstream duct portion and an adjacent opposed downstream edge of the central duct portion, thus forming an essentially continuous secondary jet means,
(d) the edges of the duct portions defining the jets are chamfered so as to be disposed obliquely to the duct side wall and form portions of cones centered on the duct central portion.

5. A fluid propulsive device as claimed in claim 4 in which the duct portions are connected together to permit relative axial movement between the duct portions so that spacing between edges of the adjacent duct portions is adjustable axially to vary size of the jet means so as to vary flow of working fluid into the main duct.

6. A fluid propulsive device as claimed in claim 5 in which the angles of the cones defining the adjacent edges of a particular jet means are selected so that spacing between the adjacent edges of a jet decreases towards the duct central portion to produce a convergent jet.

7. A fluid propulsive device as claimed in claim 1 in which the primary and secondary jet means are characterized by:
(a) a plurality of nozzles spaced peripherally around the side wall of the duct generally within the diametrical plane of the respective jet means, the nozzles of the jet means having axes inclined to the adjacent duct side wall at angles equal to the angles of inclination of the jet means.

8. A fluid propulsive device as claimed in claim 7 in which the primary and secondary jet means are characterized by:
(a) a plurality of nozzle elements spaced peripherally around an outer surface of the duct adjacent the primary and secondary planes, each element having spaced inner and outer end walls and a passage extending from and inclined to the inner end wall at an angle equal to the angle of the axis of the respective jet means, the inner end wall of each element being secured adjacent the outer surface of the duct,
(b) the duct side wall having a plurality of obliquely disposed openings, each opening being aligned with a respective passage in the nozzle element to define with the respective passage one nozzle of the jet means.

9. A fluid propulsive device as claimed in claim 1 further including an inner body disposed within the main duct to form an annular duct of essentially constant cross-sectional area so that the duct central portion is annular and is spaced midway between the inner body and the main body surrounding the inner body, the inner body receiving working fluid under pressure and being characterized by:
(a) an inner primary jet means extending peripherally around a portion of the inner body and receiving working fluid under pressure, the inner primary jet means being disposed generally within the primary diametrical plane and being adapted to project downstream into the annular duct an inner primary partially conical spray of working fluid, the inner primary jet means having an axis inclined initially to the inner body side wall at an angle generally equal to the angle of inclination of the primary jet means of the main duct so that the axis of the inner primary jet means intersects the axis of the primary jet means of the main duct approximately at the duct central portion,
(b) an inner secondary jet means disposed downstream of the inner primary jet means and extending peripherally around a portion of the inner body and receiving working fluid under pressure, the inner secondary jet means being disposed generally within the secondary diametrical plane and being adapted to project downstream into the annular duct an inner secondary partially conical spray of working fluid, the inner secondary jet means having an axis inclined to side wall of the inner body at an angle which is generally equal to the angle of inclination of the secondary jet means of the main duct.

10. A fluid propulsive device as claimed in claim 9 in which:
   (a) the inner body is formed of closely spaced, aligned upstream, central and downstream inner body portions,
   (b) the inner primary jet means is defined by an axial spacing between a downstream edge of the upstream inner body portion and an adjacent opposed upstream edge of the central inner body portion,
   (c) the inner secondary jet means is defined by an axial spacing between an upstream edge of the downstream inner body portion and an adjacent opposed downstream edge of the central inner body portion.

11. A fluid propulsive device as claimed in claim 9 in which:
   (a) the axes of the primary jet means of the main duct and the inner primary jet means are inclined to the duct side wall and the inner body side wall respectively at angles of between 25 and 30 degrees,
   (b) the axes of the secondary jet means of the main duct and the inner secondary jet means are inclined to the duct side wall and the inner body side wall respectively at angles of between 6 and 8 degrees.

* * * * *